(12) United States Patent
Subramanian et al.

(10) Patent No.: US 8,010,143 B2
(45) Date of Patent: Aug. 30, 2011

(54) METHOD AND APPARATUS FOR IMPLICIT FLOOR CONTROL IN PUSH-TO-TALK OVER CELLULAR SYSTEMS

(75) Inventors: Ramachandran Subramanian, San Diego, CA (US); Roozbeh Atarius, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 11/341,962

(22) Filed: Jan. 26, 2006

(65) Prior Publication Data

US 2006/0212526 A1    Sep. 21, 2006

Related U.S. Application Data

(60) Provisional application No. 60/648,341, filed on Jan. 28, 2005.

(51) Int. Cl.
H04B 7/00 (2006.01)

(52) U.S. Cl. .......................... 455/518; 455/519; 455/520

(58) Field of Classification Search ................. 455/90.2, 455/412.1, 414.1, 517–520, 78, 79, 426.1, 455/416, 420; 370/352, 389, 338, 328
See application file for complete search history.

(56) References Cited

U.S. PATENT DOCUMENTS

| | | | | |
|---|---|---|---|---|
| 5,274,838 | A * | 12/1993 | Childress et al. | 455/9 |
| 2003/0063616 | A1 * | 4/2003 | Lee | 370/401 |
| 2004/0192364 | A1 * | 9/2004 | Ranalli et al. | 455/517 |
| 2004/0219940 | A1 * | 11/2004 | Kong et al. | 455/518 |
| 2004/0224710 | A1 * | 11/2004 | Koskelainen et al. | 455/518 |
| 2004/0249949 | A1 * | 12/2004 | Gourraud et al. | 709/227 |
| 2005/0032539 | A1 * | 2/2005 | Noel et al. | 455/518 |
| 2005/0101299 | A1 * | 5/2005 | Farnsworth | 455/412.1 |
| 2006/0052127 | A1 * | 3/2006 | Wolter | 455/519 |
| 2006/0063553 | A1 * | 3/2006 | Iyer et al. | 455/519 |
| 2006/0146702 | A1 * | 7/2006 | Hart et al. | 370/229 |
| 2007/0037599 | A1 * | 2/2007 | Tillet et al. | 455/521 |
| 2007/0123284 | A1 * | 5/2007 | Schliwa-Bertling et al. | 455/518 |

FOREIGN PATENT DOCUMENTS

| | | |
|---|---|---|
| JP | 05075643 | 3/1993 |
| JP | 08168068 | 6/1996 |
| JP | 2004533170 | 10/2004 |
| WO | WO03036801 | 5/2003 |
| WO | WO03/101007 | 12/2003 |
| WO | 2004105414 | 2/2004 |
| WO | WO2004102997 | 11/2004 |

OTHER PUBLICATIONS

International Search Report and Written Opinion—PCT/US2006/003205, International Search Authority—European Patent Office—May 16, 2006.

* cited by examiner

*Primary Examiner* — Dominic E Rego
(74) *Attorney, Agent, or Firm* — Kristine U. Ekwueme

(57) ABSTRACT

A method and apparatus for implicit floor control in push-to-talk over cellular system. A message is generated by a client in a communication system and is then streamed to a push-to-talk server. The server checks to see if the floor is idle, and if so, distributes the message to at least one other participant in the communication session. If the floor is not idle, the new message is stored and queued for distribution after all other messages ahead of the last received message have been distributed.

35 Claims, 4 Drawing Sheets

METHOD AND APPARATUS FOR IMPLICIT FLOOR CONTROL IN PUSH-TO-TALK OVER CELLULAR SYSTEMS

CLAIM OF PRIORITY UNDER 35 U.S.C. §119

The present Application for Patent claims priority to Provisional Application No. 60/648,341, entitled "Method and Apparatus for Implicit Floor Control in Push-to-Talk Over Cellular Systems" filed Jan. 28, 2005, and assigned to the assignee hereof and hereby expressly incorporated by reference herein.

FIELD OF THE INVENTION

The present invention relates generally to communication systems, and more specifically, to a method and apparatus for implicit floor control in push-to-talk over cellular systems.

BACKGROUND

Wireless communication technologies have seen tremendous growth in the last few years. This growth has been fueled in part by the freedom of movement offered by wireless technologies and the greatly improved quality of voice and data communications over the wireless medium. Improved quality of voice services along with the addition of data services have had and will continue to have a significant effect on the communicating public.

FIG. 1 is a block diagram that shows a Push-to-Talk over Cellular (PoC) service and an Instant Messaging (IM) service, both operating in a wireless communication system 100.

An Instant Messaging (IM) service uses an IM service to exchange messages with other IM clients 108. Even though IM service was developed to exchange text based information, there is no restriction to carrying other types of information such as audio clips, images, etc. Also, there is no restriction on a user regarding what to transmit and when to transmit. Typically, the information is not streamed from the sender to receiver. Users may transmit at any time, as there is no concept of floor control.

A Push-to-Talk over Cellular (PoC) service establishes a half-duplex audio communication channel between a group of PoC users or clients, 104, as shown in FIG. 1. At most, one member of a PoC group has the right to transmit at any time and all other members receive the transmitted information. A floor control mechanism is used to arbitrate requests for the right to transmit from different members of the group. The talk burst generated by the sender is packetized and is streamed to the receivers.

It is difficult for a PoC service to interwork with an IM service because of the explicit floor control mechanism of the PoC service. Floor control is used in the PoC service to ensure that only one client transmits audio packets at a time. In contrast, the IM service has no concept of floor control, as each member of the IM group may transmit at any time. The PoC service packetizes the audio and then streams the audio to other participants. This is not the case in the IM service, where the IM client buffers the audio packets and creates an audio clip, which is then distributed to other IM session participants. Since users in one group may desire to communicate with users in the other service, there is a need for a method and apparatus to allow the PoC service to interwork with the IM service. This may be accomplished with a method and apparatus for implicit floor control in push-to-talk over cellular systems.

SUMMARY

In one aspect of the invention, a method for implicit floor control in a push-to-talk over cellular system is provided. The method comprises the steps of generating a message in a communication system, where the communication system allows for multiple participants in a session and also includes a floor. The message is streamed to a server in the communication system which distributes the message to at least one participant in the session if the floor is idle. If the floor in not idle, the message is queued and sent when the floor becomes idle.

An apparatus is also provided. The apparatus comprises means for generating a message in a communication system, where the communication system allows for multiple participants in a session and also includes a floor; means for streaming a message to a server in the communication system; means for storing the message at the server; means for distributing the message to at least one participant if the floor is idle; and means for queuing the message if the floor is not idle.

Computer-readable instructions stored on computer-readable media are also provided. These instructions direct the generation of a message in a communication system, wherein the communication system allows for multiple participants in a session and includes a floor; streaming the message to a server in the communication system; distributing the message to at least one participant if the floor is idle; and queuing the message if the floor is not idle.

DETAILED DESCRIPTION

The word "exemplary" is used herein to mean "serving as an example, instance, or illustration". Any embodiment described herein as "exemplary" is not necessarily to be construed as preferred or advantageous over other embodiments.

Figure 1:
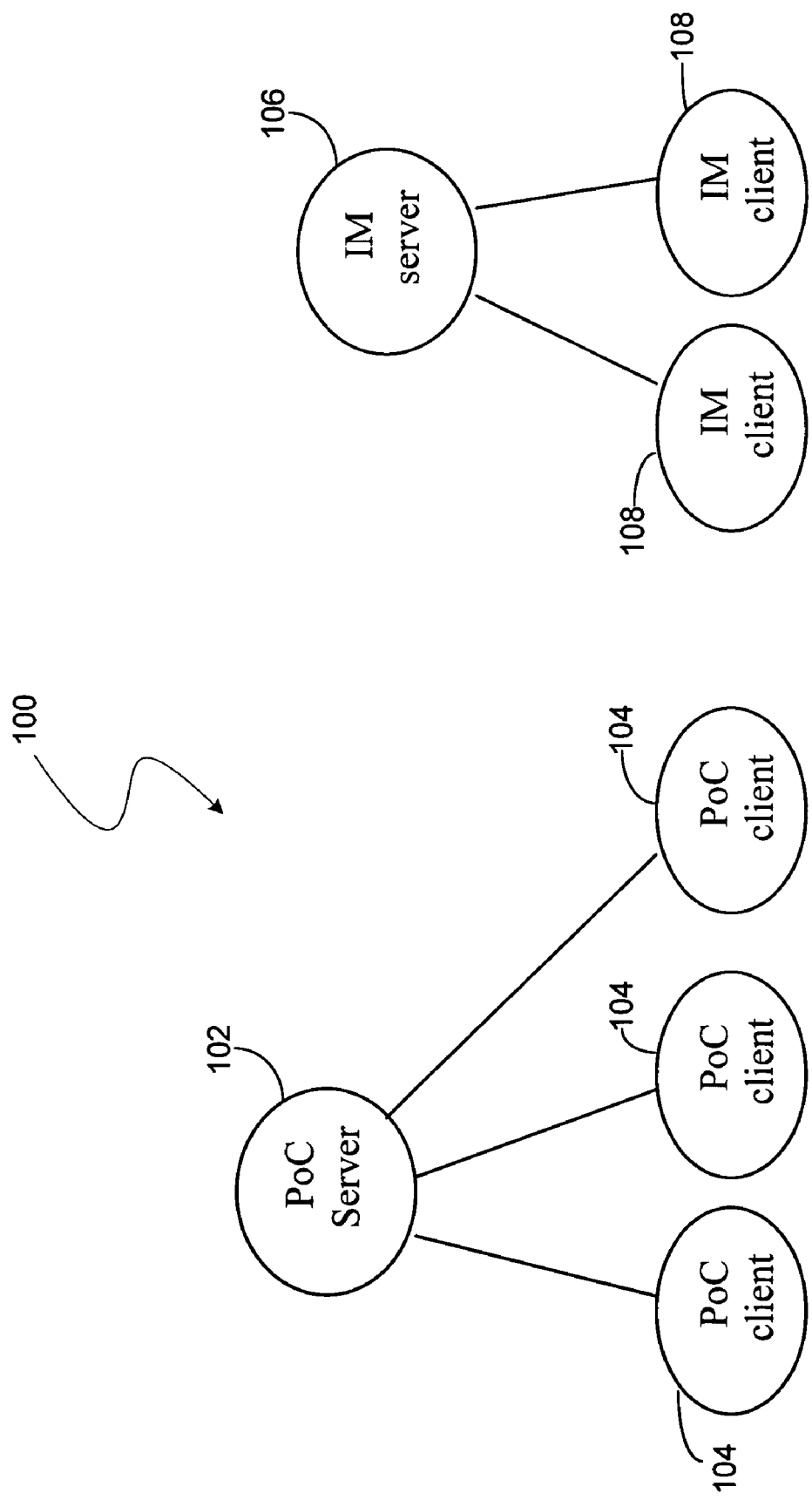
FIG. 1 is a block diagram that shows a PoC service and an IM service in a wireless communication system according to one embodiment.

There are some fundamental differences between PoC services and other services, such as IM services. As noted above, and shown in FIG. 1, PoC service uses floor control such that a PoC server 102 will only distribute audio packets received from a group member that has the floor. The PoC server 102 will discard audio packets received from other members of the group. A client must request and be granted the floor before being allowed to transmit audio packets. A client may be a mobile terminal or other communication device. In contrast, the IM service does not use floor control and has no concept of floor control. Each member of an IM group may transmit at any time. The IM client 108 buffers the audio packets and creates an audio clip which is then distributed to the other participants in the IM session. This differs from the PoC client, which packetizes the audio into packets and streams the packets to the other participants in the PoC session. As a result of these differences, IM clients typically experience greater delays than PoC clients. To allow a PoC service and an IM service to work together necessitates methods to overcome the difficulties posed by the floor control protocol and the streaming nature of the audio in the PoC service.

Figure 2:
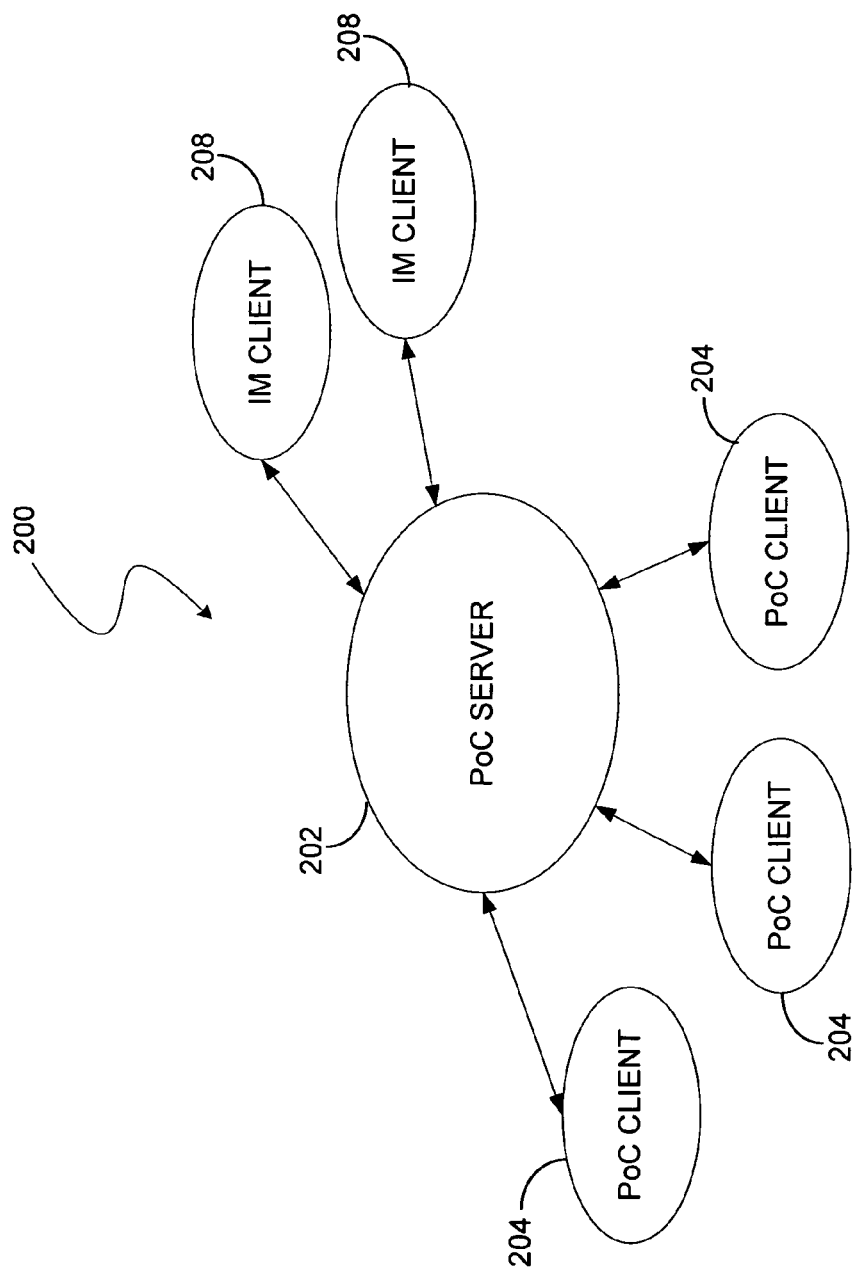
FIG. 2 is a block diagram showing a PoC service interacting with PoC clients and IM clients according to one embodiment.

FIG. 2 is a block diagram that shows a PoC service and IM and PoC clients in a wireless communication system, 200, according to one embodiment. The PoC server 202 interfaces with PoC clients 204 as described above. Each PoC client 204 packetizes audio and streams them to the PoC server for distribution to other clients, 204 as well as IM clients 208. The explicit floor control mechanism used with the PoC service is replaced by an implicit mechanism that allows a participant to talk without first having to request the floor. This facilitates operation of a PoC service with other services, such as IM services. It should be understood that the IM service in FIG. 2 may be any service that does not utilize a floor control protocol.

The PoC service is a half-duplex communication system operating among a number of participants. At any given time, at most one user has the right to transmit, i.e., has the floor. The other participants receive the transmission. The floor control protocol arbitrates the requests for floor. From the PoC server point of view, only one participant is transmitting and the PoC server transmits to the other participants in the session. Such an explicit floor control mechanism does not allow IM service participants to interface with the ongoing PoC session.

When an explicit floor control protocol is used, the PoC server maintains the state of the floor (busy or idle; if busy, the current owner, duration of current ownership, etc) at all times. In addition, the PoC server may also permit queueing of requests for the floor. Using the floor control protocol, a PoC client 204 requests the floor from the PoC server 202. The PoC server 202 will then queue the request for the floor and acknowledge the request. When the PoC server 202 grants the floor to a PoC client 204, the PoC server 202 notifies the PoC client 204 and the PoC client 204 then begins transmission.

Figure 3:
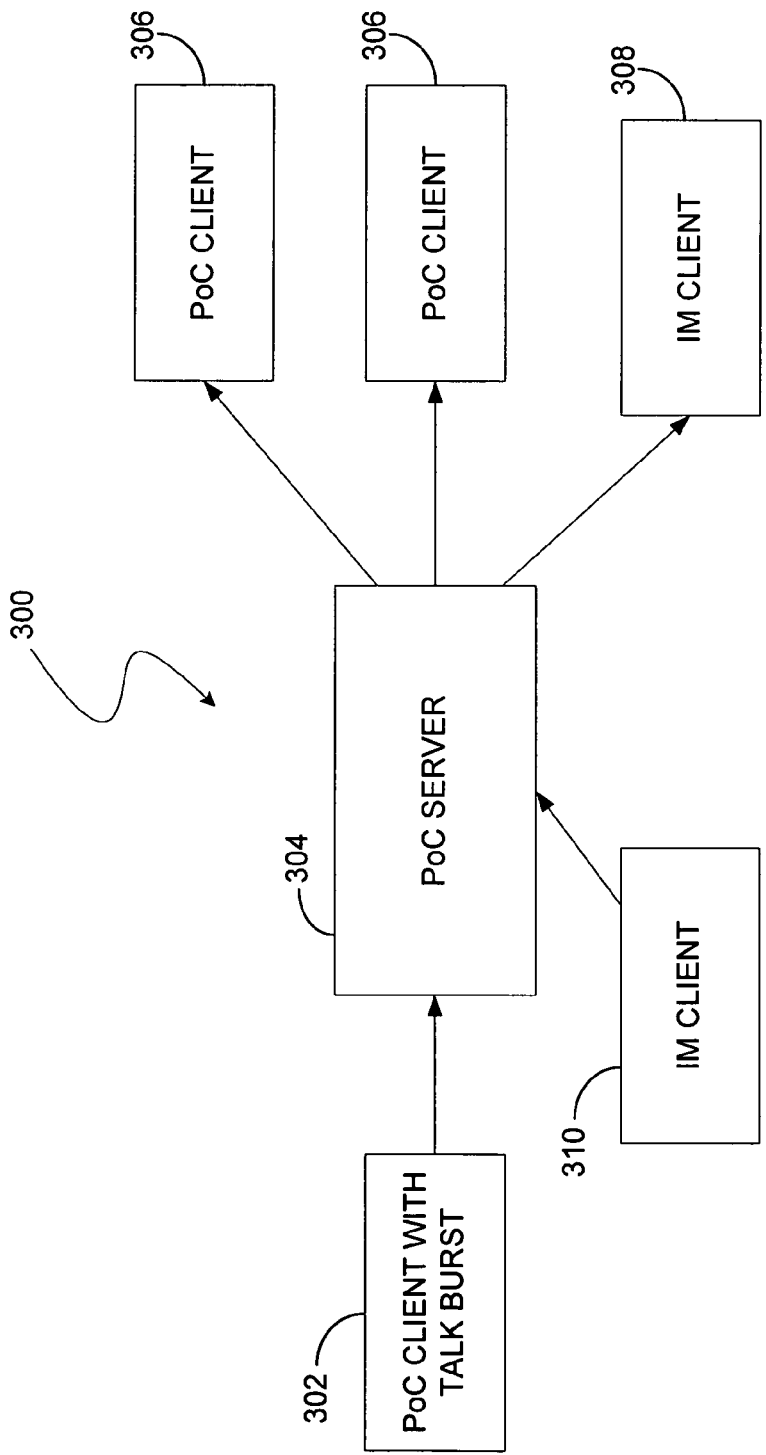
FIG. 3 is a diagram illustrating the distribution of talk bursts according to one embodiment.

FIG. 3 illustrates the flow of messages in an embodiment of the invention. The use of an explicit floor control mechanism is eliminated and replaced with an implicit floor control mechanism. A PoC client 302 and an IM client 310 both have messages to be transmitted. The other client may be an IM client or a client of a different, non-PoC system. Both clients stream their messages to the PoC server 304. Neither client makes a request for the floor and neither is granted the floor. When PoC server 304 begins receiving the messages it first checks the state of the floor. If the floor is idle the PoC server 304 begins replicating the message and distributing it to other PoC clients 306 and an IM client 308. If the floor is busy, that is, another talk burst or message is already being distributed, then the PoC server 304 buffers the incoming talk burst or message and places it in a queue for later distribution when the floor is idle. Once the floor is idle, the PoC server 304 begins transmitting the talk burst or message to all participants in the session. As the PoC server 304 receives the incoming messages or talk bursts from different participants or clients, it buffers the voice streams and serializes them so that the listener experience is not degraded. An advantage for clients is that there is no need to wait for the floor to be granted, but may begin talking immediately.

Figure 4:
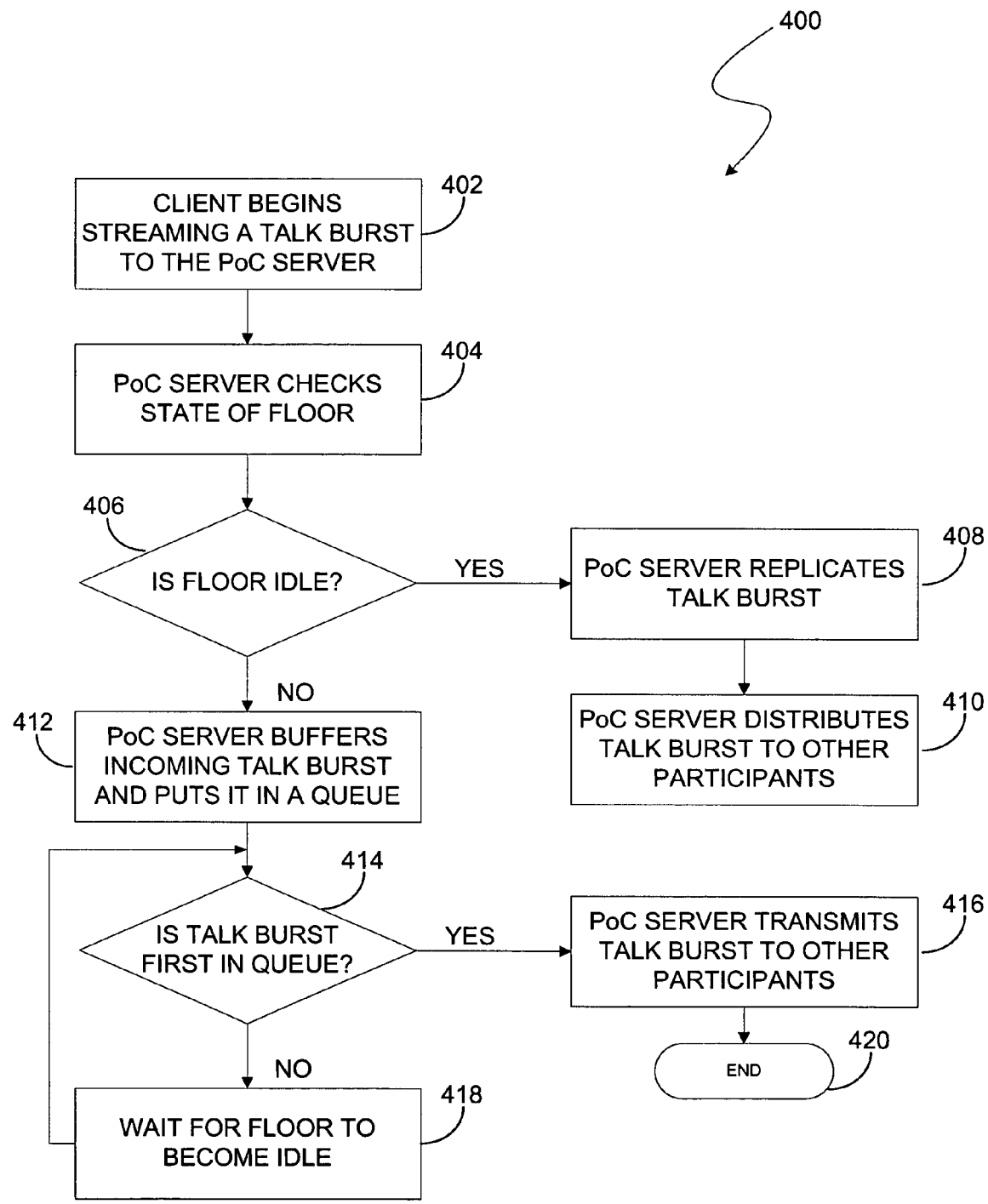
FIG. 4 is a flow diagram illustrating the steps of a method according to one embodiment.

FIG. 4 details a method of providing implicit floor control in a push-to-talk over cellular (PoC) system. The method, 400, begins when a client, begins streaming a talk burst to the PoC server in step 402. The PoC server checks the state of the floor in step 404. The PoC server determines if the floor is idle in decision block 406. If the floor is idle, the PoC server replicates the talk burst in step 408 and then distributes the talk burst in step 410.

If the floor is not idle in step 406, the PoC server buffers the incoming talk burst in step 412 and places it in a queue, which is stored in the memory of the PoC server. The PoC server checks the queue to determine if all the talk bursts ahead of the just received talk burst have been sent in decision block 214. If the talk burst is first in the queue, then the PoC server transmits the talk burst to the other participants in step 416. If the talk burst is not first in the queue, then the PoC server continues to wait for the floor to become idle in step 418. Once the floor becomes idle the message is transmitted as described in steps 416. Once all talk bursts have been sent the process stops, in step 420.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
    receiving a streamed message at a server in a communication system, wherein the communication system allows for multiple participants in a session and includes a floor, wherein the message does not include a request for the floor;
    distributing the streamed message to at least one participant in the session if the floor is idle;
    queuing the streamed message if the floor is not idle; and
    distributing the queued message to at least one participant in the session when the floor becomes idle.

2. The method of claim 1, where the communication system is a push-to-talk over cellular (PoC) system.

3. The method of claim 1, where at least one participant in the session is an instant messaging (IM) client.

4. The method of claim 3, wherein the message originates from the IM client.

5. The method of claim 1, where at least one participant in the session is a client of a different system.

6. The method of claim 5, wherein the message originates from the client of the different system.

7. The method of claim 1, wherein distributing the queued message to at least one participant in the session when the floor becomes idle, further comprises:
    distributing the queued message if the queued message is the first message in the queue.

8. The method of claim 1, wherein queuing the message if the floor is not idle, further comprises:
    serializing the message.

9. The method of claim 8, wherein distributing the queued message to at least one participant in the session when the floor becomes idle, further comprises:
    distributing the queued message in a serialized order.

10. The method of claim 1, wherein distributing further comprises:
    distributing to an IM client and a PoC client.

11. The method of claim 1, wherein receiving further comprises receiving a plurality of streamed messages from an IM client and a PoC client, wherein queuing further comprises queuing and serializing the plurality of streamed messages if the floor is not idle, and wherein distributing the queued message further comprises distributing the queued and serialized plurality of streamed messages in a serialized order to at least one IM client and to at least one PoC client when the floor becomes idle.

12. A server apparatus in a communication system, comprising:
    means for receiving a streamed message, wherein the communication system allows for multiple participants in a session and includes a floor, wherein the message does not include a request for the floor;
    means for distributing the streamed message to at least one participant in the session if the floor is idle;
    means for queuing the streamed message if the floor is not idle; and
    means for distributing the queued message to at least one participant in the session when the floor becomes idle.

13. The apparatus of claim 12, wherein the communication system is a push-to-talk over cellular (PoC) system.

14. The apparatus of claim 12, wherein at least one participant in the session is an instant messaging (IM) client.

15. The apparatus of claim 14, wherein the message originates from the IM client.

16. The apparatus of claim 12, wherein at least one participant in the session is a client of a different system.

17. The apparatus of claim 16, wherein the message originates from the client of the different system.

18. The apparatus of claim 12, wherein the means for distributing the queued message to at least one participant in the session when the floor becomes idle, further comprises:
    means for distributing the queued message if the queued message is the first message in the queue.

19. The apparatus of claim 12, wherein the means for queuing the message if the floor is not idle, further comprises:
    means for serializing the message.

20. The apparatus of claim 19, wherein means for distributing the queued message to at least one participant in the session when the floor becomes idle, further comprises:
    means for distributing the queued message in a serialized order.

21. The apparatus of claim 12, wherein means for distributing further comprises:
    means for distributing to an IM client and a PoC client.

22. The apparatus of claim 12, wherein the means for receiving further comprises means for receiving a plurality of streamed messages from an IM client and a PoC client, wherein the means for queuing further comprises means for queuing and serializing the plurality of streamed messages if the floor is not idle, and wherein the means for distributing the queued message further comprises means for distributing the queued and serialized plurality of streamed messages in a serialized order to at least one IM client and to at least one PoC client when the floor becomes idle.

23. A computer-readable medium including computer-executable instructions, comprising:
    receiving a streamed message at a server in a communication system, wherein the communication system allows for multiple participants in a session and includes a floor, wherein the message does not include a request for the floor;
    distributing the streamed message to at least one participant in the session if the floor is idle;
    queuing the streamed message if the floor is not idle; and
    distributing the queued message to at least one participant in the session when the floor becomes idle.

24. At least one processor, comprising:
    a first processor component configured for receiving a streamed message at a server in a communication system, wherein the communication system allows for multiple participants in a session and includes a floor, wherein the message does not include a request for the floor;
    a second processor component configured for distributing the streamed message to at least one participant in the session if the floor is idle;
    a third processor component configured for queuing the streamed message if the floor is not idle; and
    a fourth processor component configured for distributing the queued message to at least one participant in the session when the floor becomes idle.

25. A server in a communication system, comprising:
a module configured to:
- receive a streamed message, wherein the communication system allows for multiple participants in a session and includes a floor, wherein the message does not include a request for the floor;
- distribute the streamed message to at least one participant in the session if the floor is idle;
- queue the streamed message if the floor is not idle; and
- distribute the queued message to at least one participant in the session when the floor becomes idle; and a processor configured to execute the module.

26. The server of claim 25, where the communication system is a push-to-talk over cellular (PoC) system.

27. The server of claim 25, where at least one participant in the session is an instant messaging (IM) client.

28. The server of claim 27, wherein the message originates from the IM client.

29. The server of claim 25, where at least one participant in the session is a client of a different system.

30. The server of claim 29, wherein the message originates from the client of the different system.

31. The server of claim 25, wherein the module configured to distribute the queued message to at least one participant in the session when the floor becomes idle, further comprises the module configured to:
- distribute the queued message if the queued message is the first message in the queue.

32. The server of claim 25, wherein the module configured to queue the message if the floor is not idle, further comprises the module configured to:
- serialize the message.

33. The server of claim 32, wherein the module configured to distribute the queued message to at least one participant in the session when the floor becomes idle, further comprises the module configured to:
- distribute the queued message in a serialized order.

34. The server of claim 25, wherein the module configured to distributing further comprises the module configured to:
- distribute to an IM client and a PoC client.

35. The server of claim 25, wherein the module configured to receive further comprises the module configured to receive a plurality of streamed messages from an IM client and a PoC client, wherein the module configured to queue further comprises the module configured to queue and serialize the plurality of streamed messages if the floor is not idle, and wherein the module configured to distribute the queued message further comprises the module configured to distribute the queued and serialized plurality of streamed messages in a serialized order to at least one IM client and to at least one PoC client when the floor becomes idle.

* * * * *